United States Patent
Manteiga et al.

(10) Patent No.: US 12,123,316 B2
(45) Date of Patent: Oct. 22, 2024

(54) METHODS AND MULTI-PURPOSE POWDER REMOVAL FEATURES FOR ADDITIVE MANUFACTURING

(71) Applicant: General Electric Company, Schenectady, NY (US)

(72) Inventors: John Alan Manteiga, Lynn, MA (US); Gregg Hunt Wilson, Cincinnati, OH (US); Stephen Joseph Waymeyer, Evendale, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/981,628

(22) Filed: Nov. 7, 2022

(65) Prior Publication Data

US 2023/0060291 A1    Mar. 2, 2023

Related U.S. Application Data

(63) Continuation of application No. 15/200,492, filed on Jul. 1, 2016, now Pat. No. 11,511,340.

(51) Int. Cl.
*B22F 5/10* (2006.01)
*B22F 3/24* (2006.01)
(Continued)

(52) U.S. Cl.
CPC ............... *F01D 25/24* (2013.01); *B22F 3/24* (2013.01); *B22F 5/106* (2013.01); *B22F 10/20* (2021.01);
(Continued)

(58) Field of Classification Search
CPC ............ B22F 5/106; B22F 3/24; B22F 10/20; B22F 10/28; B22F 10/68; B22F 12/67;
(Continued)

(56) References Cited

U.S. PATENT DOCUMENTS 4,863,538 A    9/1989    Deckard
4,938,816 A    7/1990    Beaman et al.
(Continued)

FOREIGN PATENT DOCUMENTS

EP    2891769 A1    7/2015
EP    3015189 A1    5/2016
(Continued)

OTHER PUBLICATIONS

European Patent Office Action issued in connection with corresponding EP Application No. 17739774.2 dated May 3, 2022 (7 pages).
(Continued)

*Primary Examiner* — Dominick L Plakkoottam
*Assistant Examiner* — Paul W Thiede
(74) *Attorney, Agent, or Firm* — Dinsmore & Shohl LLP (57) ABSTRACT

The present disclosure generally relates to methods for additive manufacturing (AM) for fabricating multi-walled structures. A multi-walled structure includes a first wall having a first surface and a second wall having a second surface facing the first surface to define a passage having a width between the first surface and the second surface in a first direction. The multi-walled structure also includes an enlarged powder removal feature connecting the first wall and the second wall. The enlarged powder removal feature has an inner dimension greater than the width in the first direction and at least one open end in a direction transverse to the first width.

14 Claims, 5 Drawing Sheets

(51) Int. Cl.
*B22F 10/20* (2021.01)
*B22F 10/28* (2021.01)
*B22F 10/68* (2021.01)
*B22F 12/37* (2021.01)
*B22F 12/67* (2021.01)
*B29C 64/153* (2017.01)
*B29C 64/35* (2017.01)
*B33Y 10/00* (2015.01)
*B33Y 40/00* (2020.01)
*B33Y 40/20* (2020.01)
*B33Y 80/00* (2015.01)
*F01D 25/24* (2006.01)

(52) U.S. Cl.
CPC ............... *B22F 10/28* (2021.01); *B22F 10/68* (2021.01); *B22F 12/67* (2021.01); *B29C 64/153* (2017.08); *B29C 64/35* (2017.08); *B33Y 10/00* (2014.12); *B33Y 40/00* (2014.12); *B33Y 40/20* (2020.01); *B33Y 80/00* (2014.12); *B22F 2003/247* (2013.01); *B22F 12/37* (2021.01); *F05D 2230/22* (2013.01); *F05D 2230/31* (2013.01); *Y02P 10/25* (2015.11); *Y02T 50/60* (2013.01)

(58) Field of Classification Search
CPC ............... B22F 12/37; B22F 2003/247; B29C 64/153; B29C 64/35; B33Y 10/00; B33Y 40/00; B33Y 40/20; B33Y 80/00; F01D 25/24; F05D 2230/22; F05D 2230/31; Y02P 10/25; Y02T 50/60
See application file for complete search history.

(56) References Cited

U.S. PATENT DOCUMENTS

| | | | |
|---|---|---|---|
| 5,075,966 A * | 12/1991 | Mantkowski | C23C 28/00 29/458 |
| 5,460,758 A | 10/1995 | Langer et al. | |
| 6,981,846 B2 | 1/2006 | Liang | |
| 7,625,522 B2 * | 12/2009 | Cooper | B22F 5/10 419/38 |
| 11,511,340 B2 * | 11/2022 | Manteiga | B22F 5/106 |
| 2003/0175453 A1 * | 9/2003 | Steffier | F28D 7/0041 428/34.5 |
| 2010/0078022 A1 | 4/2010 | Striebig et al. | |
| 2013/0264750 A1 | 10/2013 | Hofacker et al. | |
| 2014/0077422 A1 | 3/2014 | Minick | |
| 2014/0195001 A1 | 7/2014 | Grohowski, Jr. | |
| 2015/0001093 A1 * | 1/2015 | Carter | B22F 5/10 205/640 |
| 2015/0048209 A1 | 2/2015 | Hoyt et al. | |
| 2015/0104326 A1 | 4/2015 | Waldman et al. | |
| 2015/0267543 A1 * | 9/2015 | Gerber | B22F 5/009 416/212 R |
| 2015/0275916 A1 * | 10/2015 | Marshall | F04D 29/563 29/888.025 |
| 2016/0023272 A1 * | 1/2016 | Mongillo, Jr. | B22F 5/10 219/76.12 |
| 2016/0108815 A1 * | 4/2016 | Schmitz | F28D 1/0476 29/890.03 |
| 2016/0116222 A1 * | 4/2016 | Shedd | F28F 1/36 165/166 |
| 2016/0121389 A1 | 5/2016 | Slavens | |
| 2016/0332251 A1 | 11/2016 | Bunker | |
| 2016/0332371 A1 | 11/2016 | Staroselsky | |

FOREIGN PATENT DOCUMENTS

| | | | | |
|---|---|---|---|---|
| JP | 2013-194263 A | 9/2013 | | |
| WO | 2012066311 A2 | 5/2012 | | |
| WO | WO-2015050987 A1 * | 4/2015 | ............ | B22C 9/10 |

OTHER PUBLICATIONS

International Search Report and Written Opinion issued in connection with corresponding PCT Application No. PCT/US2017/038909 dated Sep. 20, 2017.

* cited by examiner

METHODS AND MULTI-PURPOSE POWDER REMOVAL FEATURES FOR ADDITIVE MANUFACTURING

CROSS-REFERENCE TO RELATED APPLICATIONS

This application is a continuation application of U.S. patent application Ser. No. 15/200,492, filed Jul. 1, 2016, which is relied upon and incorporated herein by reference in its entirety.

INTRODUCTION

The present disclosure generally relates to methods for manufacturing powder removal features using additive manufacturing (AM), as well as novel reinforced structures manufactured by these AM processes.

BACKGROUND

AM processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an energy beam, for example, an electron beam or electromagnetic radiation such as a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758 describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

Figure 1:
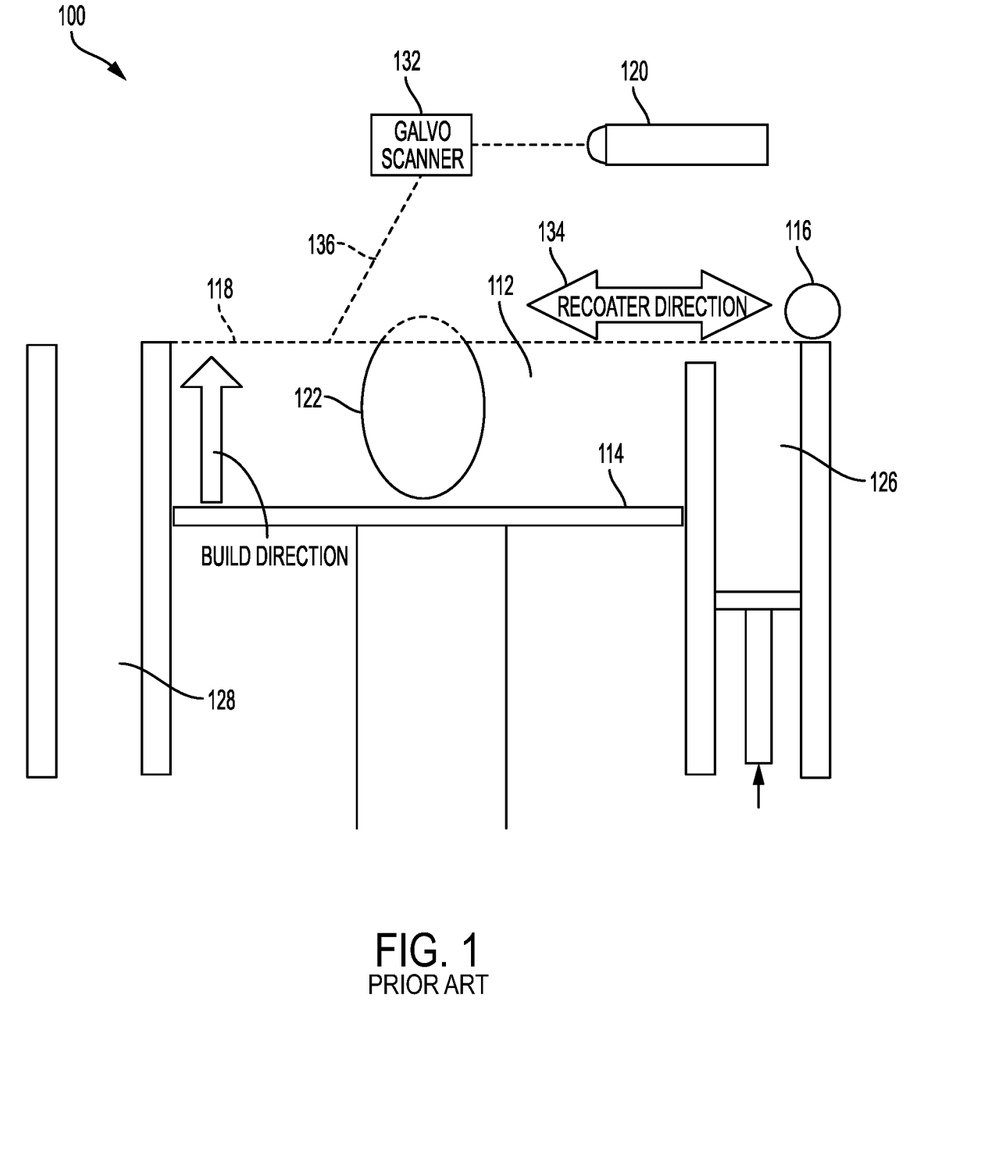
FIG. 1 is schematic diagram showing an example of a conventional apparatus for additive manufacturing.

FIG. 1 is schematic diagram showing a cross-sectional view of an exemplary conventional system 100 for direct metal laser sintering (DMLS) or direct metal laser melting (DMLM). The apparatus 100 builds objects, for example, the part 122, in a layer-by-layer manner by sintering or melting a powder material (not shown) using an energy beam 136 generated by a source such as a laser 120. The powder to be melted by the energy beam is supplied by reservoir 126 and spread evenly over a build plate 114 using a recoater arm 116 travelling in direction 134 to maintain the powder at a level 118 and remove excess powder material extending above the powder level 118 to waste container 128. The energy beam 136 sinters or melts a cross sectional layer of the object being built under control of the galvo scanner 132. The build plate 114 is lowered and another layer of powder is spread over the build plate and object being built, followed by successive melting/sintering of the powder by the laser 120. The process is repeated until the part 122 is completely built up from the melted/sintered powder material. The laser 120 may be controlled by a computer system including a processor and a memory. The computer system may determine a scan pattern for each layer and control laser 120 to irradiate the powder material according to the scan pattern. After fabrication of the part 122 is complete, various post-processing procedures may be applied to the part 122. Post processing procedures include removal of access powder by, for example, blowing or vacuuming. Other post processing procedures include a stress release process. Additionally, thermal and chemical post processing procedures can be used to finish the part 122.

The present inventors have discovered that additive manufacturing techniques may be used to create multi-walled structures that serve various purposes. For example, a multi-walled structure may provide structural strength while providing ducts between the walls to allow airflow. During manufacturing, however, the multi-walled structure may create a partially enclosed space that may retain powder. For example, it may be difficult to remove powder from a narrow space between two walls. In some cases, the retained powder may become sintered during post-processing procedures, making it more difficult to remove the retained powder.

In view of the above, it can be appreciated that there are problems, shortcomings or disadvantages associated with AM techniques, and that it would be desirable if improved methods of manufacturing multi-walled structures and removing powder therefrom were available.

SUMMARY

The following presents a simplified summary of one or more aspects of the invention in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In one aspect, the disclosure provides a method for fabricating an object. The method includes: (a) irradiating a layer of powder in a powder bed with an energy beam in a series of scan lines to form a fused region; (b) providing a subsequent layer of powder over the powder bed by passing a recoater arm over the powder bed from a first side of the powder bed to a second side of the powder bed; and (c) repeating steps (a) and (b) until the object is formed in the powder bed. The object includes a first wall having a first surface and a second wall having a second surface facing the first surface to define a passage having a width between the first surface and the second surface in a first direction. The object also includes an enlarged powder removal feature connecting the first wall and the second wall. The enlarged powder removal feature has an inner dimension greater than the width in the first direction and at least one open end in a direction transverse to the first width.

In another aspect, the disclosure provides an engine component. The engine component includes a first wall having a first surface and a second wall having a second surface facing the first surface to define a passage having a width between the first surface and the second surface in a first direction. The engine component also includes an enlarged powder removal feature connecting the first wall and the second wall. The enlarged powder removal feature has an inner dimension greater than the width in the first direction and at least one open end in a direction transverse to the first width.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Figure 2:
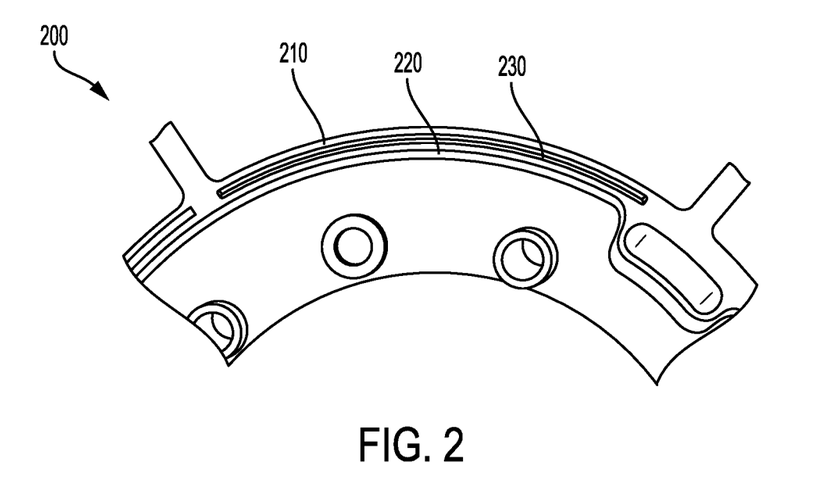
FIG. 2 illustrates an example of a multi-walled structure without powder removal features.

FIG. 2 illustrates a multi-walled structure 200 including a first wall 210 and a second wall 220 that define a passage 230 between the first wall 210 and the second wall 220. The multiple walls provide various advantages over a single solid wall. Generally, the multi-walled structure 200 has lower weight than a similar solid structure due to the passage 230 between the walls 210, 220 while having similar strength and rigidity characteristics. Moreover, the passage 230 provides a degree of insulation from heat and vibration applied to one of the walls 210, 220. Further, the passage 230 may be used as a flow passage for a fluid in some components.

The multi-walled structure 200 may pose some problems for fabrication using additive manufacturing. The passage 230 may retain unfused powder that may be difficult to remove. In some cases, the passage 230 may be completely enclosed preventing removal of the unfused powder. In other cases, the relatively narrow shape of the passage 230 may allow unfused powder to resist extraction techniques (e.g., pressurized air, vacuum, solvents, etc.).

Figure 3:
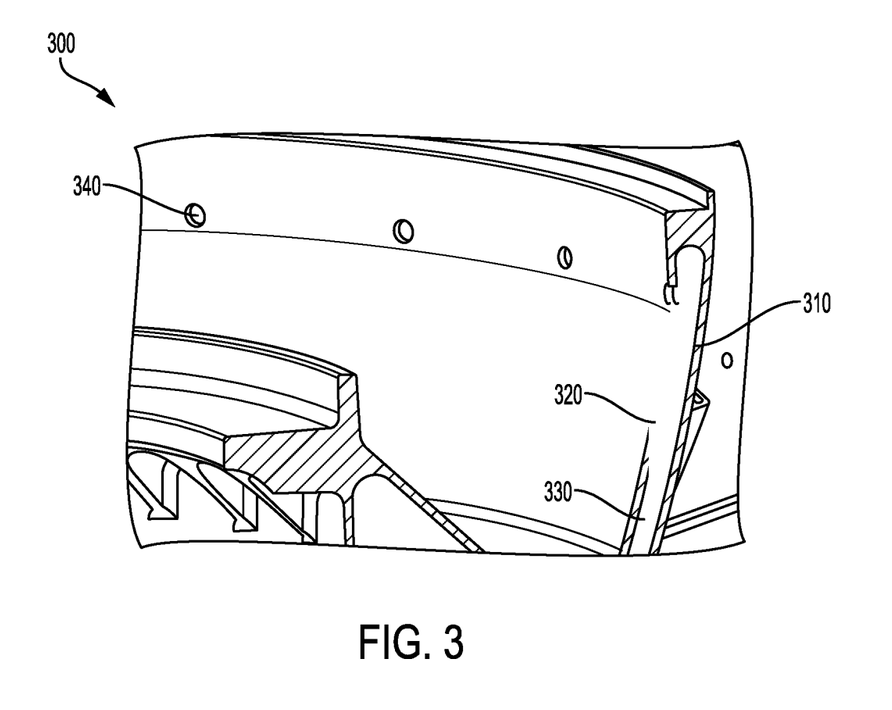
FIG. 3 illustrates an example of a multi-walled structure with powder removal holes.

FIG. 3 illustrates a multi-walled structure 300 including powder removal holes 340. The multi-walled structure 300 may be similar to the multi-walled structure 200 with wall 310 corresponding to wall 210, wall 320 corresponding to wall 220, and passage 330 corresponding to passage 230. The powder removal holes 340 may be located in a surface of one of walls 310, 320. The powder removal holes 340 provide one approach to removing powder from the passage 330. The powder removal holes 340 may be built into the multi-walled structure 300 during the additive manufacturing process, or machined using a subtractive manufacturing process (e.g., drilling). The powder removal holes 340 allow removal of unfused powder, for example, by providing a passage for the unfused powder to exit the passage 330. The powder removal holes 340 also provide a point to inject pressurized air or a solvent to facilitate removal of the unfused powder. The powder removal holes 340, however, may also result in undesirable effects. For example, the powder removal holes 340 may be located in a surface of the wall 320. The powder removal holes 340 may weaken the structure of the wall 320. The powder removal holes 340 may be filled (e.g., using weld filling or welding a plug within the powder removal holes 340. Such techniques, however, may be time consuming or result in undesirable component properties (e.g., uneven finish). Additionally, in some cases, powder removal holes 340 may be ineffective for multi-walled structures where there is no direct access to a passage 330.

Figure 4:
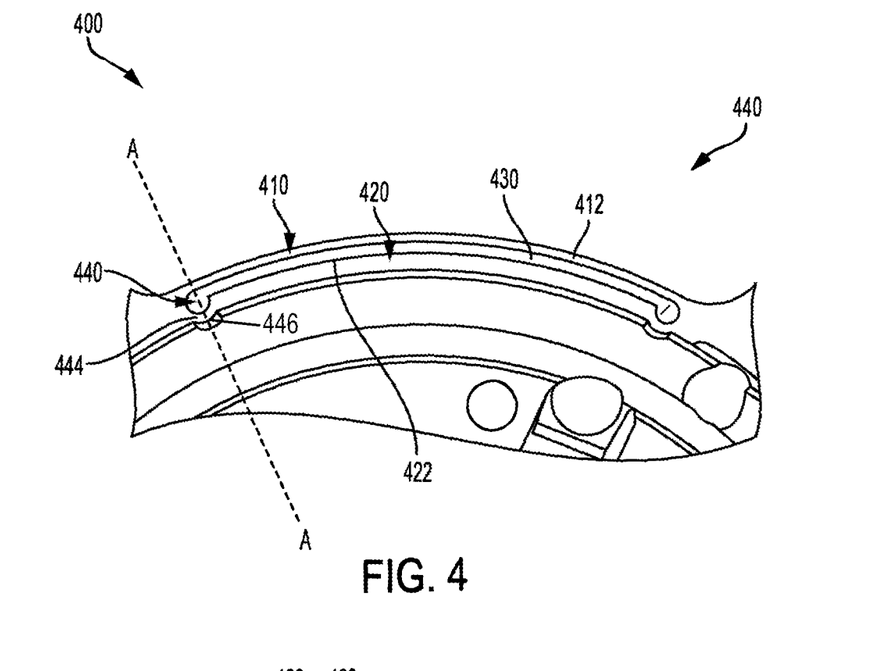
FIG. 4 illustrates a plan view of an example of a multi-walled structure with powder removal features according to an aspect of the present disclosure.
Figure 5:
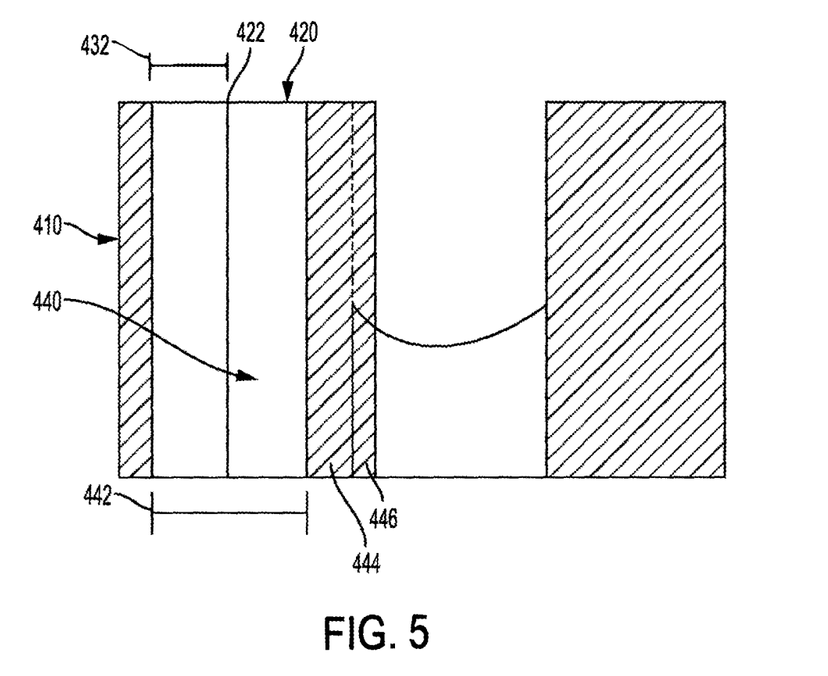
FIG. 5 illustrates a cross-sectional view of the multi-walled structure of FIG. 4.

FIGS. 4 and 5 illustrate a multi-walled structure 400 according to an aspect of the present disclosure. FIG. 4 illustrates an end view of the multi-walled structure 400. FIG. 5 illustrates a cross-section of the multi-walled structure 400 along the line A-A. The multi-walled structure 400 may be, for example, an engine component, a structural member for a vehicle, a medical device, or a solid structure for another use. The multi-walled structure 400 includes a wall 410 and a wall 420 defining a passage 430 between the walls 410, 420. In an aspect, the multi-walled structure 400 is an annular structure and the wall 410 and the wall 420 are substantially concentric arc shaped walls. The wall 410 includes a surface 412. The wall 420 includes a surface 422. As illustrated, the surface 412 is a radially inward surface of the wall 410 and the surface 422 is a radially outward surface of the wall 420. The passage 430 extends between the surface 412 and the surface 422. The passage 430 has a width 432 that is substantially constant. That is, the surface 412 conforms to the surface 422 such that the width 432 measured along any line normal to the surfaces 412, 422 is substantially the same (e.g., within 10 percent) for a majority of the surfaces 412, 422.

The multi-walled structure 400 also includes a powder removal feature 440. The powder removal feature 440 is a region adjacent the walls 410, 420 having an expanded inner dimension 442. The powder removal feature 440 is in fluid communication with the passage 430. As illustrated in FIG. 4, a semi-annular wall 444 of the powder removal feature 440 defines a hollow cylindrical column filled with unfused powder. The inner dimension 442 is an inner diameter of the semi-annular wall 444. The semi-annular wall 444 connects the wall 410 and the wall 420. Although illustrated as semi-annular, it should be appreciated that different shapes may be used to connect the wall 410 and the wall 420 wall. As best seen in FIG. 5, the inner dimension 442 is greater than the width 432. For example, the inner dimension 442 may be twice the width 432. The inner dimension 442 may also be sized to accommodate an elongated object such as a tool, tube, wire, or cable passing through the powder removal feature 440 during post processing or operation of the multi-walled structure 400. The semi-annular wall 444 forms a bulge 446 that extends beyond the wall 420. The bulge 446 provides additional structural support and rigidity for the multi-walled structure 400 by increasing the outer diameter of the powder removal feature 440. As illustrated in FIG. 4, the bulge 446 extends radially inward from the wall 420.

In an aspect, the use of additive manufacturing allows the multi-walled structure 400 to be fabricated with relatively more precision than prior art manufacturing methods (e.g., casting). For example, the walls 410, 420 may be less than 0.050 inches thick, and even approximately 0.020 inches thick. The width 432 may be selected based on design needs for the multi-walled structure 400. The width 432 may be a small as 0.005 inches. Generally, the smaller the width 432, the larger the inner diameter of the powder removal feature 440 is selected to allow powder removal from the passage 430. The powder removal feature 440 has a longitudinal axis. During fabrication, the longitudinal axis may be aligned with the build direction (e.g., up) such that the powder removal feature is supported by lower layers of the powder removal feature without overhanging edges. In cases where the multi-walled structure is shaped such that the powder removal feature does not have a straight longitudinal axis, the multi-walled structure may be oriented to minimize overhanging edges, or support structures may be added.

Figure 6:
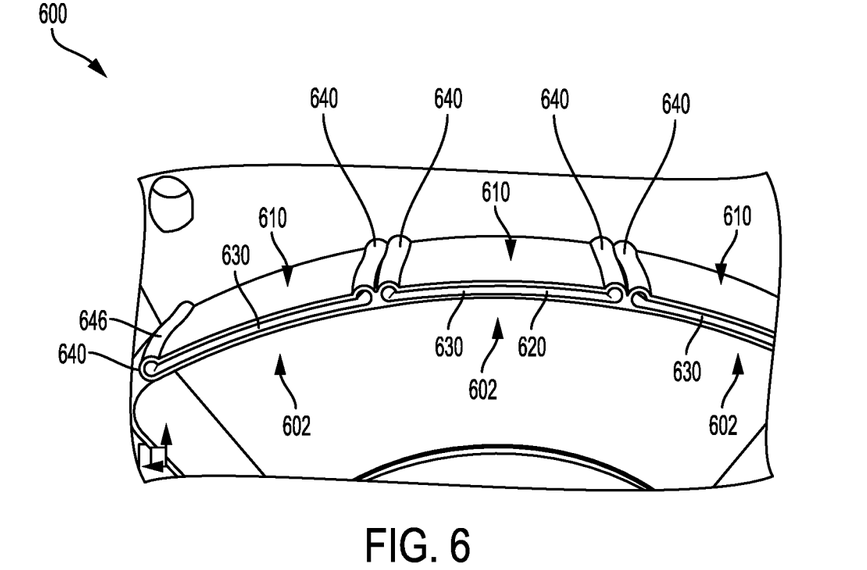
FIG. 6 illustrates another example of a multi-walled structure with powder removal features according to an aspect of the present disclosure.

FIG. 6 illustrates another multi-walled structure 600. The multi-walled structure 600 is part of an annular component. The multi-walled structure 600 includes multiple powder removal features 640 that divide the annular component into several arc shaped segments 602. Each arc shaped segment 602 has a powder removal feature 640 at each end such that a pair of powder removal features 640 are located adjacent each other between the arc shaped segments 602. In an aspect, the number, spacing, and dimensions of the powder removal features are selected to facilitate powder removal and meet strength and rigidity parameters. The use of multiple powder removal features 640 limits the length of the passages 630 such that powder can be removed via the powder removal features 640. Additionally, as illustrated in FIG. 6, the bulges 646 protrude radially outward from the wall 610 in contrast to the radially inward bulges 446 in FIG. 4. The inner wall 620 extends across several of the arc shaped segments, while each arc shaped segment has a separate outer wall 610. The bulges may also protrude from both of the walls 610, 620.

Figure 7:
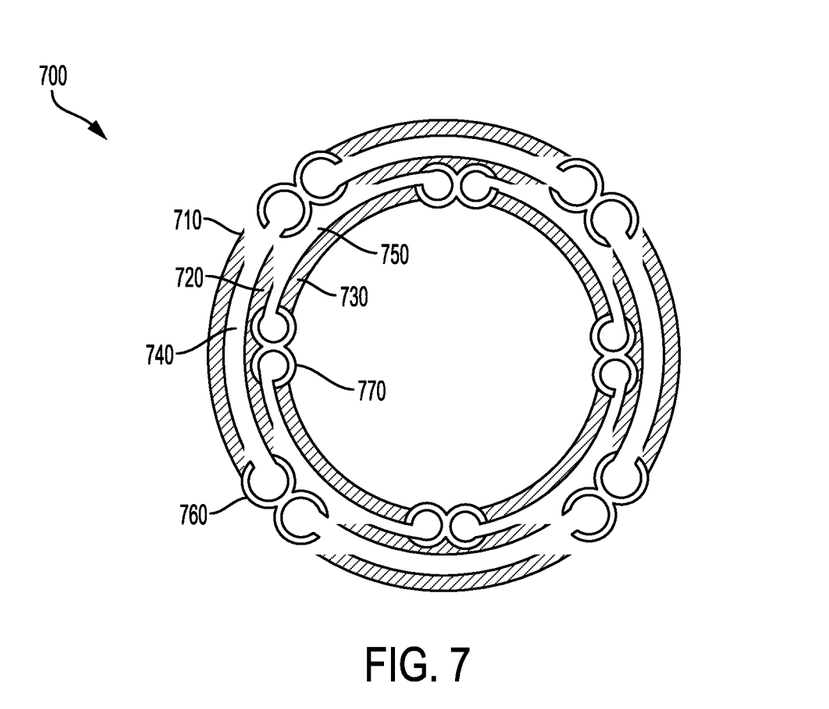
FIG. 7 illustrates an example of an annular multi-walled structure with powder removal features according to an aspect of the present disclosure.

FIG. 7 illustrates another multi-walled structure 700. The multi-walled structure 700 includes concentric arc shaped walls 710, 720, and 730. First spaces 740 are located between walls 710 and walls 720. Second spaces 750 are located between walls 720 and 730. Powder removal features 760 are located at the ends of the first spaces 740. The powder removal features 760 connect a wall 710 to a wall 720. The powder removal features 760 extend radially outward beyond the walls 710. Powder removal features 770 are located at the ends of the second spaces 750. The powder removal features 770 connect a wall 720 to a wall 730. The powder removal features 770 extend radially inward beyond the wall 730. The powder removal features 770 are offset from the powder removal features 760.

Figure 8:
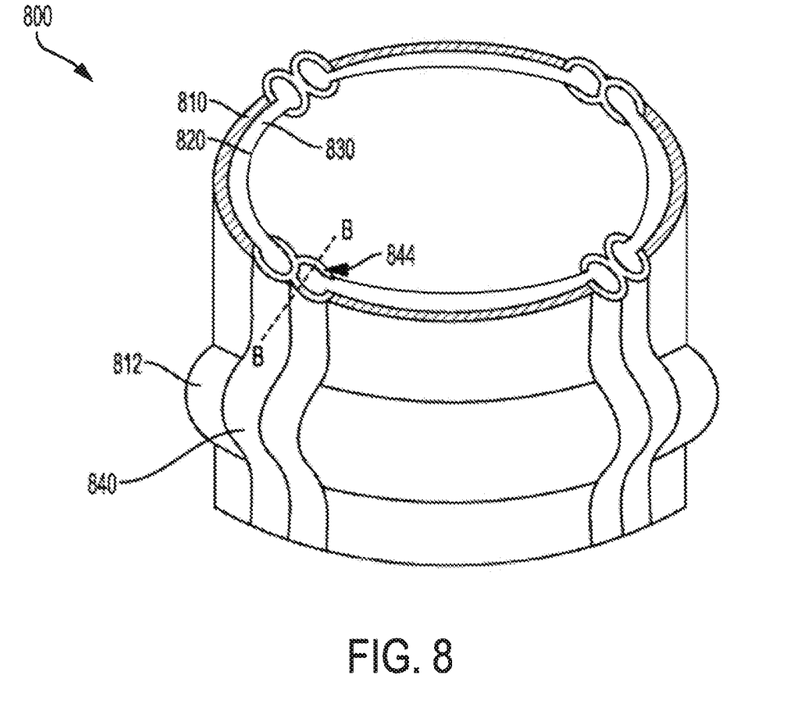
FIG. 8 illustrates an example of an annular multi-walled structure with non-linear powder removal features according to an aspect of the present disclosure.
Figure 9:
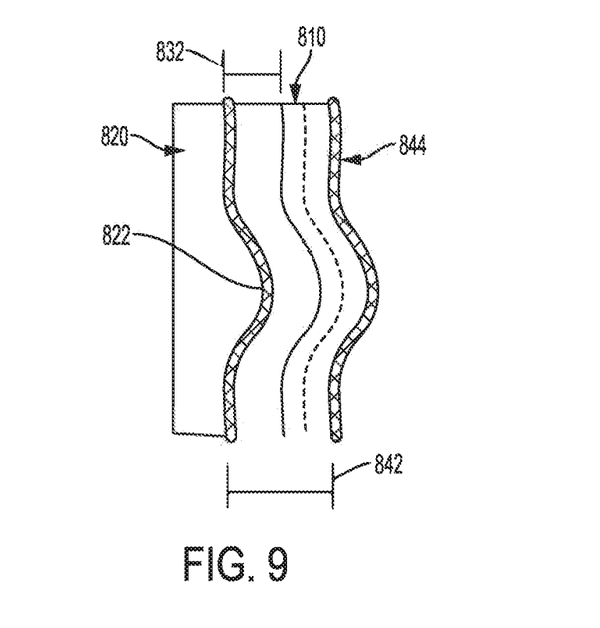
FIG. 9 illustrates a cross-sectional view of the annular multi-walled structure of FIG. 8.

FIGS. 8 and 9 illustrate a multi-walled structure 800 having non-linear powder removal features 840. FIG. 8 is a perspective view. FIG. 9 is a radial cross-section along the line B-B. The multi-walled structure 800 includes an outer wall 810, an inner wall 820, and a space 830 between the outer wall 810 and the inner wall 820. The outer wall 810 includes a curved portion 812, which extends radially outward from the rest of outer wall 810. The inner wall 820 includes a similar curved portion 822 conforming to the shape of the curved portion 812. The non-linear powder removal feature 840 is a tube formed by a semi-annular wall 844 that connects the outer wall 810 and the inner wall 820. The non-linear powder removal feature 840 may include a linear portion and a curved portion. The non-linear powder removal feature 840 has a substantially constant inner dimension 842, which is greater than a width 832 of the space 830. For example, the inner dimension (e.g., a diameter) may vary by up to 10% over the length of the powder removal feature.

Upon completion of the AM process, the multi-walled structure 400/600/700/800 may be removed from the powder bed. Unfused powder is then removed from the multi-walled structure 400/600/700/800. In an aspect, the multi-walled structure 400/600/700/800 is attached to the build plate and may be detached from the build plate before or after powder removal. At least one end of the powder removal features 440/640/760/770/840 is exposed. The powder removal features 440/640/760/770/840 facilitate removal of unfused powder from the respective multi-walled structure 400/600/700/800. For example, during a powder removal procedure, the multi-walled structure 400/600/700/800 is placed on a vibration table and vibrated. The vibrations loosen compacted powder to facilitate removal via powder removal features 440/640/760/770/840. The multi-walled structure 400/600/700 may be also rotated during vibration such that gravity draws the unfused powder toward one of the powder removal features 440/640/760/770/840. For example, the multi-walled structure 800 may be rotated such that the unfused powder follows the path of the non-linear powder removal feature 840. Additionally, compressed gas and/or vacuum may be used to remove the loose powder. For example, compressed gas may be supplied at a powder removal feature 440/640/760/770 at one end of a passage 430/630/740/750/830 and vacuum may be applied at the powder removal feature 440/640/760/770/840 located at the other end of the passage. Accordingly, the combination of compressed gas and vacuum may urge the unfused powder toward one of the powder removal features.

Additionally, the powder removal features 440/640/760/770/840 provide a conduit through the multi-walled structures 400/600/700/800 in operation. For example, when the multi-walled structure 400 is an aircraft component, the powder removal feature 440 and passage 430 may be used to route a flow of air to another component. Further, the powder removal feature 440 may be used to route an elongated object that may not fit within the passage 430. For example, a wire, fuel hose, or cable may be passed through the powder removal feature 440.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. An engine component, comprising:
an annular component that includes an annular multi-walled structure, the annular multi-walled structure comprising a plurality of arc-shaped segments disposed annularly about the annular multi-walled structure, respective ones of the plurality of arc-shaped segments being circumferentially adjacent to one another, wherein the respective ones of the plurality of arc-shaped segments comprise:
a first semi-annular wall having a first surface facing radially inward;
a second semi-annular wall disposed radially inward from the first semi-annular wall, the second semi-annular wall having a second surface facing radially outward, the second surface facing the first surface, and the first surface and the second surface defining a passage therebetween, the passage having a width between the first surface and the second surface in a first direction normal to the first and second surfaces; and
a first enlarged powder removal feature connecting the first semi-annular wall and the second semi-annular wall, the first enlarged powder removal feature having an inner dimension greater than the width in the first direction and at least one open end in a direction transverse to the width in the first direction, wherein the first enlarged powder removal feature comprises a longitudinal axis transverse to the width in the first direction,
wherein the first enlarged powder removal feature comprises a C-shaped hollow column defined by a third semi-annular wall, the hollow column being in fluid communication with the passage, wherein the first enlarged powder removal feature connects a first end of the first semi-annular wall to a first end of the second semi-annular wall, wherein the at least one open end is located at a longitudinal end of the hollow column, wherein unfused powder is removable from the enlarged powder removal feature via the at least one open end.

2. The engine component of claim 1, wherein the respective ones of the plurality of arc-shaped segments comprise a second enlarged powder removal feature connecting a second end of the first semi-annular wall to a second end of the second semi-annular wall.

3. The engine component of claim 1, wherein the width is substantially constant across the first surface and the second surface.

4. The engine component of claim 1, wherein the engine component includes a plurality of regularly spaced powder removal features disposed annularly about the annular multi-walled structure.

5. The engine component of claim 1, wherein the engine component is annular, the first semi-annular wall is an outer wall of an arcuate portion of the engine component, and the second semi-annular wall is an inner wall of the arcuate portion of the engine component.

6. The engine component of claim 1, wherein the first enlarged powder removal feature is a non-linear tube defined by the third semi-annular wall connected to the first semi-annular wall and the second semi-annular wall.

7. The engine component of claim 1, wherein the inner dimension is twice the width.

8. The engine component of claim 1, wherein the third semi-annular wall forms a bulge that extends beyond the second semi-annular wall.

9. The engine component of claim 1, wherein the first semi-annular wall and the second semi-annular wall is less than 0.050 inches thick.

10. The engine component of claim 1, wherein the width is 0.005 inches.

11. The engine component of claim 1, wherein the inner dimension is substantially constant over a length of the first enlarged powder removal feature.

12. The engine component of claim 1, wherein at least one of the first enlarged powder removal feature and the passage is configured to route a flow of air to another component.

13. The engine component of claim 1, wherein the first enlarged powder removal feature is configured to route an elongated object.

14. The engine component of claim 13, wherein the elongated object is a wire, a fuel hose, or a cable.

\* \* \* \* \*